United States Patent
Maenpaa

(10) Patent No.: US 9,503,519 B2
(45) Date of Patent: Nov. 22, 2016

(54) METHOD AND ARRANGEMENT FOR THE SUPERVISION OF TRANSACTIONS IN A PEER-TO-PEER OVERLAY NETWORK

(75) Inventor: Jouni Maenpaa, Nummela (FI)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 270 days.

(21) Appl. No.: 14/360,490

(22) PCT Filed: Nov. 25, 2011

(86) PCT No.: PCT/SE2011/051426
§ 371 (c)(1),
(2), (4) Date: May 23, 2014

(87) PCT Pub. No.: WO2013/077791
PCT Pub. Date: May 30, 2013

(65) Prior Publication Data
US 2014/0317196 A1   Oct. 23, 2014

(51) Int. Cl.
G06F 15/173 (2006.01)
H04L 29/08 (2006.01)
H04L 29/06 (2006.01)
H04L 1/18 (2006.01)

(52) U.S. Cl.
CPC .......... *H04L 67/104* (2013.01); *H04L 1/1883* (2013.01); *H04L 67/1065* (2013.01); *H04L 69/28* (2013.01)

(58) Field of Classification Search
CPC ... H04L 67/104; H04L 69/28; H04L 65/403; H04L 1/1685; H04L 1/1883
USPC ....................................... 709/204, 224, 203
See application file for complete search history.

(56) References Cited

U.S. PATENT DOCUMENTS 6,839,566 B2 * 1/2005 Casaccia .............. H04L 1/0007
370/465
8,385,267 B2 * 2/2013 Wu .................... H04L 67/1065
370/328

(Continued)

FOREIGN PATENT DOCUMENTS

EP            1450521           8/2004

OTHER PUBLICATIONS

Jennings, et al., "REsource LOcation And Discovery (RELOAD) Base Protocol", *P2PSIP, Internet-Draft, draft-ietf-p2psip-base-11*, (Oct. 12, 2010), 309 pages.

(Continued)

*Primary Examiner* — Frantz Jean
(74) *Attorney, Agent, or Firm* — Patents on Demand, P.A.; Brian K. Buchheit; Scott M. Garrett

(57) ABSTRACT

The present invention relates to the supervision of transactions in peer-to-peer (P2P) overlay networks. A P2P overlay network often consists of peers interconnected via different access technologies having significantly different round-trip time (RTT) delays. Current time supervisions of retransmissions and transactions in P2P networks have fixed values. This has the disadvantages that if the timer values are too short, unnecessary retransmissions are performed although a response would be on its way. If the timer values are too long it results in unnecessarily long messaging delays. These disadvantages have been overcome by a method and a peer for adapting the timer values to the conditions in the P2P overlay network.

12 Claims, 4 Drawing Sheets

(56) References Cited

U.S. PATENT DOCUMENTS

| | | | |
|---|---|---|---|
| 9,240,927 B2* | 1/2016 | Das | H04L 41/12 |
| 2006/0069775 A1* | 3/2006 | Artobello | H04L 67/325 709/225 |
| 2007/0192451 A1 | 8/2007 | Tran et al. | |
| 2009/0323527 A1 | 12/2009 | Accapadi et al. | |
| 2010/0064008 A1* | 3/2010 | Yan | H04L 45/64 709/204 |

OTHER PUBLICATIONS

Rosenberg, "Interactive Connectivity Establishment (ICE): A Protocol for Network Address Translator (NAT) Traversal for Offer/Answer Protocols", *Internet Engineering Task Force (IETF)*, *Request for Comments: 5245*, (Apr. 2010), 117 pages.

Rosenberg, J., et al., "Session Traversal Utilities for NAT (STUN)", *Network Working Group, Request for Comments: 5389*, (Oct. 2008), 52 pages.

Extended European Search Report, EP Application No. 11876050.3, (Jun. 25, 2015), 7 pages.

Maltz, et al., "Quantitative lessons from a full-scale multi-hop wireless ad hoc network testbed," Wireless Communications and Networking Conference, 2000, WCND, 2000, IEEE, (Sep. 23, 2000), vol. 3, pp. 992-997.

PCT International Search Report for PCT Counterpart Application No. PCT/SE2011/051426, (Nov. 26, 2012), 5 pages.

PCT Written Opinion of the International Searching Authority for PCT Counterpart Application No. PCT/SE2011/051426, (Nov. 26, 2012), 5 pages.

Castro, et al., "Performance Evaluation of Structured P2P over Wireless Multi-hop Networks", *The Second International Conference on Sensor Technologies and Applications, SENSORCOMM, IEEE*, (2008), pp. 796-801.

Jacobson, et al., "Congestion Avoidance and Control", *UCB Publication*, (Nov. 1988), pp. 1-25.

Jennings, et al., "REsource LOcation And Discovery (RELOAD) Base Protocol, draft-ietf-p2psip-base-19", *P2PSIP, Internet-Draft, Internet Engineering Task Force (IETF)*, http://tools.ietf.org/html/draft-ietf-p2psip-base-19, (Oct. 29, 2011), 156 pages.

Khan, et al., "Computing with data non-determinism: Wait time management for peer-to-peer systems", *Computer Communications vol. 31, Elsevier Science Publishers BV*, (Sep. 17, 2007), pp. 629-642.

Paxson, et al., "Computing TCP's Retransmission Timer", *Request for Comments: 6298, Internet Engineering Task Force (IETF)*, (Jun. 2011), 11 pages.

Rhea, et al., "Handling Churn in a DHT", *Proceedings of the USENIX Annual Technical Conference*, (Jun. 2004), 14 pages.

Rosenberg, J., et al., "SIP: Session Initiation Protocol", *Network Working Group, Request for Comments: 3261, The Internet Society.*, (Jun. 2002), 269 pages.

Stoica, et al., "Chord: A Scalable Peer-to Peer Lookup Protocol for Internet Applications", *IEE/ACM Transactions on Networking*, vol. 11, No. 1, (Feb. 2003), 14 pages.

Maenpaa, et al., "A Self-tuning Distributed Hash Table (DHT) for REsource LOcation And Discovery (RELOAD); draft-ietf-p2psip-self-tuning-04.txt", *P2PSIP Working Group, Internet-Draft*, https://tools.ietf.org/html/draft-ietf-p2psip-self-tuning-04, (Jul. 5, 2011), 20 pages.

International Preliminary Report on Patentability, Application No. PCT/SE2011/051426, dated Jun. 5, 2014, 6 pages.

\* cited by examiner

METHOD AND ARRANGEMENT FOR THE SUPERVISION OF TRANSACTIONS IN A PEER-TO-PEER OVERLAY NETWORK

CROSS-REFERENCE TO RELATED APPLICATIONS

This application is a National stage of International Application No. PCT/SE2011/051426, filed Nov. 25, 2011, which is hereby incorporated by reference.

TECHNICAL FIELD

The present invention relates to a method and an arrangement for the supervision of transactions in peer-to-peer overlay networks.

BACKGROUND

A Peer-to-Peer (P2P) overlay communication network is a distributed system created by the nodes participating in the system. Such an overlay network is completely decentralized and does not rely on central servers for its operation. The nodes participating in the system, called peers, route messages and store data on behalf of other nodes. The overlay network uses an algorithm such as a Distributed Hash Table (DHT) to organize the topology of interconnections among the peers participating in the system. For DHT based P2P overlay networks a ring topology is assumed. This is illustrated in FIG. 1. In this network, a peer 110 maintains a set of links to other peers 111-117 on the ring 100. This set of links is the peer's routing table. In some DHTs such as Chord, the entries in the routing table are called fingers 115-117. Chord is described in more detail in the paper 'Chord: A Scalable Peer-to-Peer Lockup Protocol for Internet Applications' by Stoica et al published in 2003. In addition to the routing table, each peer 110 also maintains another data structure called the neighbor list. The neighbor list consists of a successor list and a predecessor list. The successor list contains pointers to the immediate successors 111,112 and the predecessor list to the immediate predecessors 113,114 of peer 110. The way a peer 110 picks its neighbors and fingers is determined by the DHT algorithm. The successors 111,112 and predecessors 113,114 are also called direct neighbors and the fingers 115-117 are called routing neighbors. The term 'neighbor peer' is here used to include both successors 111,112 predecessors 113,114 and fingers 115-117.

Peers in a DHT-based overlay network are identified using node identifiers (Node-IDs). When a given peer 110 wants to transmit a message to another peer 130 end-to-end, it follows a recursive routing process. The peer 110 initiating a message consults its routing table to find the closest predecessor of the target Node-ID (say for example peer 116) and forwards the message to that peer 116. The receiving peer 116 then repeats the same routing process. This recursive routing process continues (for example via peer 120) until the message reaches the peer 130 identified by the target Node-ID.

The messages are sent using a P2P signaling protocol. The messages and their responses are supervised by end-to-end retransmission and end-to-end transaction timers. An end-to-end retransmission timer is used to determine by a peer 110 that has originated a message when the message should be retransmitted if no response has been received. An end-to-end transaction timer is a timer that determines the maximum lifetime of a request, that is, the time after which the originating peer 110 considers the request to have failed if no response has been received.

End-to-end timers are different from hop-by-hop timers. End-to-end timers are used to control the lifetime of the transaction and retransmission across multiple intermediate hops in the overlay network. In contrast, hop-by-hop timers are used by intermediate peers forwarding a message to control the retransmissions over a single hop between two peers. Examples of the latter are timers in the TCP protocol.

An example of a P2P signaling protocol is RELOAD (Resource Location And Discovery Base Protocol) as described in the draft IETF paper 'draft-ietf-p2psip-base-19' by Jennings et al and published in October 2011. The RELOAD protocol uses a fixed 3 second end-to-end retransmission timer at the initiating peer 110 and considers the transaction to have failed if no response is received within a fixed time limit of 15 seconds (i.e., RELOAD uses a 15 second transaction timer).

Many P2P overlay networks consist of heterogeneous devices. One example of heterogeneity in the device population is the access network type that the device is using. Some of the devices may use a fixed Internet connection, whereas others might use a wireless or cellular connection. Some of the types of connections that different devices may use are listed below:

Wireless connection: different versions of the Wi-Fi (IEEE 802.11) standard, WiMAX
Cellular connection: GPRS, EDGE, UMTS, HSDPA, HSPA, LTE, etc.
Fixed connection: ISDN, ADSL, LAN, fiber, cable
Other: satellite For example, a peer 110 in the overlay network may maintain, in its routing table, links with peers 111-117 using very different access technologies. As an example, the routing table of a given peer 110 may contain one peer 115 with a narrowband GSM data link with a 14.4 kbit/s bandwidth, and another peer 117 connected via a broadband fiber-to-home link having a 100 Mbit/s bandwidth, and anything in between. Further, the geographical distances between the peers may vary especially in global-scale overlays such as in a global P2PSIP telephony network. The Round Trip Times (RTTs) associated with communicating with these devices may therefore be of completely different magnitude.

Significantly different Round Trip Times cause however problems when using fixed timer values for the end-to-end transaction and retransmission timers in P2P signaling protocols such as RELOAD. If the timer values are too short, this results in unnecessary retransmissions and requests that are considered to have failed although a response would be on its way. If the fixed timer values are too long, the result is unnecessarily long messaging delays for transactions requiring retransmissions.

Fixed values for the transaction timer assume that all messages travel the same number of hops in the overlay. This assumption is not true since the number of hops messages travel depends on the numerical distance between the source and destination Node-IDs. Fixed timer values are also not suitable when conditions (such as traffic load on a link, overlay network size, or signal strength of a wireless connection) change.

Since P2P overlay networks determine peer aliveness based on transaction timeouts, inappropriately configured fixed timers can result in too slow reaction to failed peers and even unnecessary removals of peers from the routing table.

SUMMARY

With this background, it is the object of the present invention to obviate at least some of the disadvantages mentioned above.

The object is achieved by a method to supervise a transaction between two peers end-to-end in the structured DHT based P2P overlay communication network where the values of the retransmission and transaction timers can be adapted to the conditions in the overlay network (including different access technologies and different distances between the peers).

The method comprises the initial step of determining an average data packet round-trip time, $RTT_{AVG}$ between the first peer and its neighbor peers in the overlay network. This can for example be done by calculating an average of measured RTT delays between the first peer and each of its neighbor peers.

The next step is to determine a timer value $T_R$ for the retransmission timer. This value is calculated from the equation:

$$T_R = \tfrac{1}{2} \times \log_2(N) \times RTT_{AVG}$$

where N is the total number of peers in the overlay network.

When transmitting from the first peer a message that requires a response from the second peer and the message is sent for the first time, the retransmission timer and a transaction timer are both started. The retransmission timer is set with the determined value $T_R$. The value $T_T$ of the transaction timer is determined to a value $T_T > T_R$. The value $T_T$ can for example be calculated from the equation:

$$T_T = \log_2(N) \times RTT_{MAX}$$

where $RTT_{MAX}$ is the largest RTT value determined from the RTT delay measurements mentioned above.

If a response from the second end-to-end peer is not received within the time=$T_R$ from transmitting the message, and if the transaction timer is still running, the message is transmitted again and the retransmission timer is restarted with the value $T_R$.

If the response from the second peer is not received within the time=$T_T$ from transmitting the first message, the message or its response is regarded as lost and the transaction is terminated.

Optionally the RTT values are determined at regular intervals in order to cover situations when the peers are moving around and/or are joining and leaving the ring topology.

As the method adapts the values of the end-to-end retransmission and transaction timers to different circumstances in the overlay network this has a number of advantages. Unnecessary retransmissions over different kind of access technologies and between peers of different distances can be minimized resulting in a considerable reduction in traffic load. Unnecessary long message delays can be avoided in cases where retransmissions in fact are needed. The method does also allow an overlay network to detect failed or departed peers faster than if fixed time supervisions were used. Embodiments of the method do also cope for situations when the size of the overlay network changes when peers are joining and/or leaving the network. The method can for example be used to set timers in P2P signaling protocols such as RELOAD, STUN and ICE. Individual steps in the method can even be used to set timers in the SIP protocol.

The invention further includes a peer comprising at least one interface unit configured to be connected to at least one neighbor peer in the overlay network and a computing unit. The computing unit is configured to execute the method of supervising a transaction as described above.

The invention will now be described in more detail and with preferred embodiments and referring to accompanying drawings.

DETAILED DESCRIPTION

To illustrate the problems with fixed timer values, a number of measurements of the delays have been done for lookup requests in a P2PSIP overlay network. This is illustrated in Table 1 below.

Figure 2:
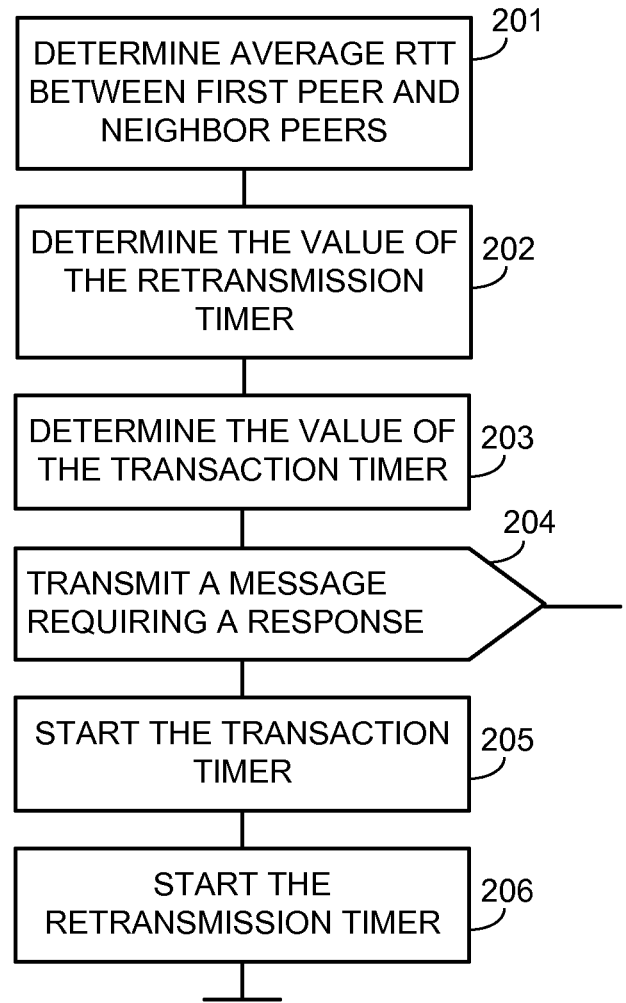
FIGS. 2 and 3 are flow charts illustrating an embodiment of a method to supervise transactions in a P2P overlay network.
Figure 3:
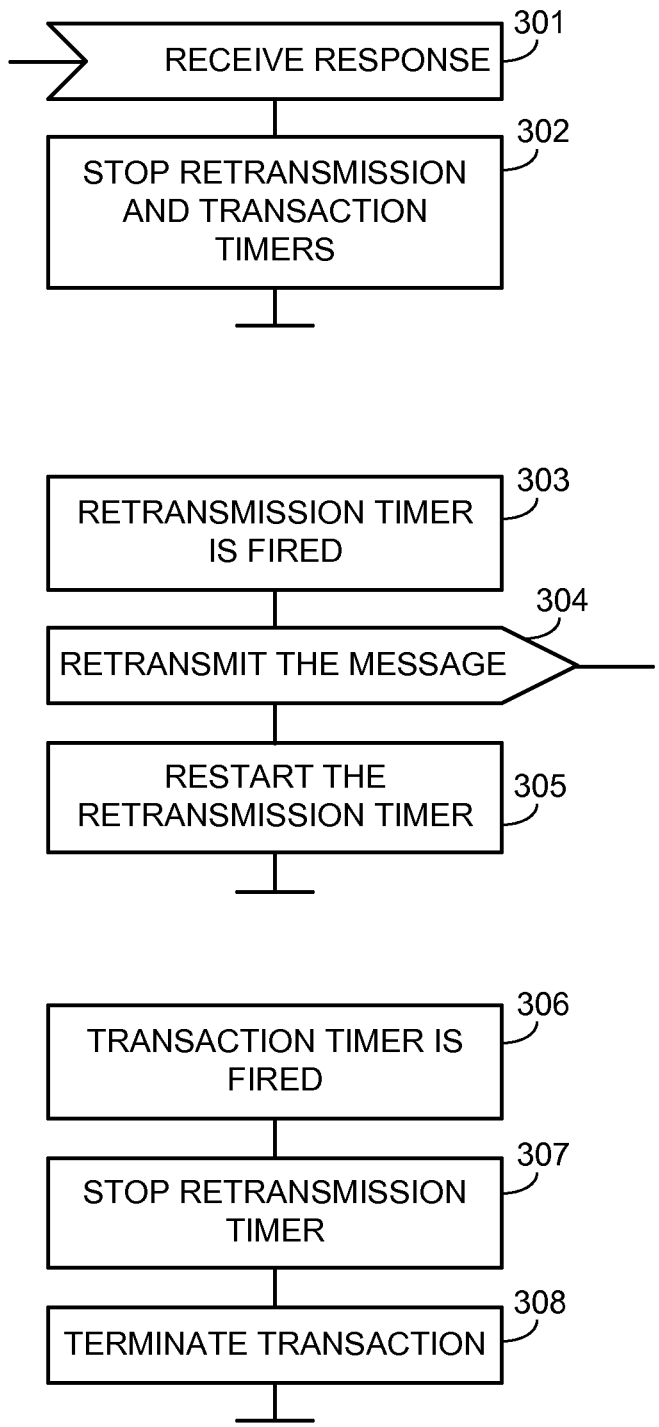

In the measurements, the RELOAD protocol is used with the above-mentioned fixed 3 s retransmission timer and 15 s transaction timer. The measurements were carried out in three networks: a 1000-peer overlay network consisting only of peers with a high-speed LAN connection, a 10000-peer overlay network consisting of peers with a high-speed LAN connection, and a 2000-peer overlay network consisting only of peers with a 3G HSDPA cellular connection. The table clearly shows the problems with fixed timers. As an example, in the 2000-peer overlay network consisting of HSDPA-connected peers, there are on the average 4 unnecessary retransmissions per request. This quadruples the amount of traffic in the overlay network, which is extremely inefficient. Further, in the worst case in the same network (see the max lookup transaction delay in Table 1), the lookup request transaction delay is higher than the 15 s transaction timer. This means that the lookup request is in many cases incorrectly considered to have failed even though the response is on its way. To overcome this, a method for adapting the time supervisions of the retransmissions and transactions in the structured DHT based P2P overlay communication network is presented. The basic steps in this method are illustrated in FIGS. 2 and 3.

TABLE 1

| | Transaction delays | | | |
|---|---|---|---|---|
| | Average lookup request transaction delay (seconds) | Average unnecessary retransmissions per lookup request | Max lookup request transaction delay (seconds) | Unnecessary retransmissions per lookup request |
| 1000-peer overlay | 2.89 s | 0 | 6.64 s | 2 |

TABLE 1-continued

| | Transaction delays | | | |
|---|---|---|---|---|
| | Average lookup request transaction delay (seconds) | Average unnecessary retransmissions per lookup request | Max lookup request transaction delay (seconds) | Unnecessary retransmissions per lookup request |
| with only LAN-connected peers 10000-peer overlay with only LAN-connected peers | 3.72 s | 1 | 12.30 s | 4 |
| 2000-peer overlay with only HSDPA-connected nodes | 13.00 s | 4 | 25.50 s | 8 |

The method comprises the initial step 201 of determining an average data packet round-trip time, $RTT_{AVG}$ between the first peer 110 and its neighbor peers 111-117 in the overlay network.

Figure 1:
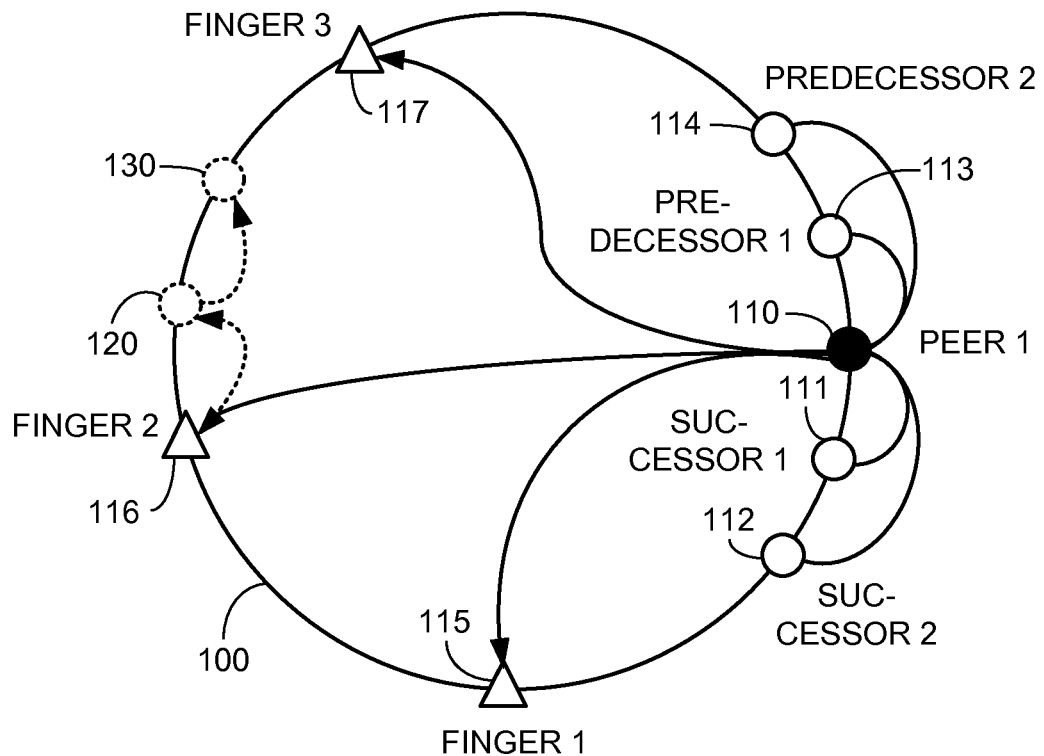
FIG. 1 is a simplified block diagram illustrating a ring topology of a P2P overlay network.

$RTT_{AVG}$ can be calculated from the equation:

$$RRT_{AVG} = \frac{\sum_{i=1}^{K} RRT_{EST_i}}{K}$$

where K is the number of neighbor peers and $RTT_{ESTi}$ is the estimated data packet round-trip time between the first peer 110 and the ith neighbor peer. In the simplified example in FIG. 1, K has the value K=7. The value $RTT_{ESTi}$ for each neighbor peer 111-117 can be estimated in a number of different ways.

One option is to for each neighbor peer 111-117 store an array of RTT values of the M most recent messages exchanged with that neighbor peer. In this case, $RTT_{ESTi}$ can be calculated as a moving average over the M values or by taking the median of the M values.

Another option is to regularly measure the RTT of each message exchanged with the neighbor peer and to calculate an average of the measured values. The measured RTT, referred to as $RTT_{SAMPLE}$, can for example be used to update a weighted average value as follows:

$$RTT_{ESTi} = \alpha \times RTT_{ESTi} + (1-\alpha) \times RTT_{SAMPLE}.$$

$RTT_{SAMPLE}$ is the RTT from the most recent transaction and α is a weight value. The purpose of α, whose value is selected from the range 0<α<1 is to ensure that the most recently measured RTT value influences the average more than the previously measured RTT values. The benefit of using a weighted average is that the peer measuring the RTT values does not need to store past samples.

In a Chord-based overlay network whose size is N (that is, having N peers), the peers typically maintain on the order of $\log_2(N)$ fingers, $\log_2(N)$ successors, and at least one predecessor. As an example, peers in a 10000 peer overlay network would maintain roughly 30 entries in their routing table. Thus, every peer would maintain $RTT_{ESTi}$ values for 30 neighbor peers.

Since Node-IDs are assigned at random in DHT based overlay networks, the peers that get selected into a given peer's routing table are randomly distributed across the geographical area in which the peers are located. In a global overlay network, the peers in the routing table are randomly distributed over the whole world. This ensures that the $RTT_{ESTi}$ values that a peer collects cover a wide range of geographical distances. Thus, if one calculates an average over these values, the average should reflect well the average global RTT in the overlay.

A peer 110 may also maintain multiple $RTT_{ESTi}$ values for different message sizes for each peer in its routing table. This improves accuracy of the estimate on narrowband links where the impact of message size on transmission delay is significant. For instance, in the example shown in Table 2, a peer maintains different size estimates at 250 byte intervals between message sizes 0 and the Maximum Transmission Unit (MTU) of the network, which in the example is assumed to be the Ethernet MTU, 1500 bytes.

TABLE 2

| Multiple RTT estimates per peer | |
|---|---|
| Range [bytes] | Estimate |
| [0, 250) | $RTT_{ESTa}$ |
| [250, 500) | $RTT_{ESTb}$ |
| [500, 750) | $RTT_{ESTc}$ |
| [750, 1000) | $RTT_{ESTd}$ |
| [1000, 1250) | $RTT_{ESTe}$ |
| [1250, 1500) | $RTT_{ESTf}$ |

When this feature is used, a peer 110 that is originating a message first checks the size of the message. It then chooses the $RTT_{ESTx}$ value of the message size range within which the size of the request falls and uses that as input when calculating the $RTT_{AVG}$ value.

The estimates of the $RTT_{AVG}$ value in peer 110 can be further improved by collecting the corresponding $RTT_{AVG}$ values, $RTT_{AVGi}$ from its neighbor peers 111-117 and/or other peers 120,130 in the overlay network. When a number of $RTT_{AVGi}$ values are collected, a new average value $RTT_{AVG}$ in peer 110 can be calculated from the equation:

$$RRT_{AVG} = \frac{RRT_{AVG} + \sum_{i=1}^{J} RRT_{AVG_i}}{J+1}$$

where J is the number of collected $RTT_{AVGi}$ values from the neighbor peers 111-117 and/or the other peers 120,130. This procedure can be implemented in a plurality of peers in the overlay network.

In order to allow a peer 110 to collect $RTT_{AVGi}$ values from another peer, the peer 110 can create a dictionary record (a special record stored in the overlay network that consists of <key, value> pairs and that is supported for instance by the RELOAD protocol) stored under its own Node-ID. Henceforth, this dictionary will be referred to as the Node Dictionary. Storing the Node Dictionary under the peer's own Node-ID ensures that the peer will itself be responsible for storing the dictionary record. In the dictionary record, the peer can store the values that might be of interest to other peers using 'well-known' keys. 'Well-known' keys are here keys whose meaning all the peers in the overlay network supporting the concept of the present invention know. To store the value of the local $RTT_{AVG}$, for instance the key "rtt-estimate" could be used.

Other values can be made available in the Node Dictionary by using further well-known keys such as "hop-count-estimate", "max-observed-rtt", "max-observed hop-count", etc.

The Node Dictionary record described above can be extended to contain the peer's Access Network Type (ANT), assuming that the peer is aware of such information. Such information could be stored under a well-known key "access-network-type". The value associated with the key may indicate for instance that the access network type is "gprs", "lte", "adsl-8192", or any other value that is well-known among the peers in the overlay network. A given peer may fetch the access network type information of all of the peers in its routing table and store the information in the same data structure that it uses to store the $RTT_{EST}$ values of its routing table entries. This allows the peer to maintain access network type specific $RTT_{EST}$ values, which can be utilized to produce more accurate values for the retransmission and transaction timers as will be explained below.

Of course, the peer observing the ANT-specific RTTs is also located behind an access network. Therefore, the ANT-specific RTT estimates that this peer maintains are only valid for the combination of its own access network type and the remote access network types. To learn more possible combinations, the peer can fetch further values from other peers in its routing table. Other peers can make such information available by storing a list of <ant-1, ant-2, rtt-estimate> triples in the Node Dictionary under a well-known key such as "delays-to-other-peers".

Besides ANT-specific RTT estimates, a peer 110 may also maintain information about the number of peers in its routing table using a specific ANT. This information can be stored in the Node Dictionary as a list of <ANT, n> pairs, where n is the number of peers in the routing table using the specific ANT. The list is stored under a well-known key such as "access-network-type-count".

Based on the ANT information in its routing table and the ANT information fetched from other peers, a peer 110 may produce, for each access network technology, an estimate of how large a percentage of peers in the overlay use that specific access network technology. As an example, assuming that the size of routing tables is 30 entries, if a peer collects ANT information from 4 peers in addition to itself, and learns that there are 15 peers behind a UMTS access network, the estimate for the percentage of UMTS connected peers would be 15/(5*30)=10%.

Using the information about percentage of peers using each specific ANT, and the $RTT_{EST}$ values for different sending and receiving ANT combinations, a peer can produce a more accurate estimate of $RTT_{AVG}$ as follows:

$$\sum_{i=0}^{K} \sum_{j=0}^{K} \left( P_{ant_i} \times P_{ant_j} \times delay_{ant_i ant_j} \right)$$

where $P_{ant_i}$ is the percentage of peers using $ant_i$, $P_{ant_j}$ is the percentage of peers using $ant_j$, K is the total number of access network technologies, and $delay_{ant_i, ant_j}$ is the $RTT_{EST}$ between $ant_i$ and $ant_j$.

Returning to FIG. 2, when the value of $RTT_{AVG}$ is determined in step 201, the next step 202 in the method is to determine a timer value $T_R$ for the retransmission timer. This value $T_R$ is calculated from the equation:

$$T_R = \frac{1}{2} \times \log_2(N) \times RTT_{AVG}$$

where N is the size of the overlay network (N=total number of peers in the overlay network).

The factor '$\frac{1}{2} \times \log_2(N)$' is the average hop count $HC_{avg}$ for a message in a Chord based overlay network. This factor has been observed by experiments and is justified in the paper 'Chord: A Scalable Peer-to-Peer Lockup Protocol for Internet Applications'.

As an example, we can calculate that the average path length in an overlay whose size is N=10000 is 6.6 overlay routing hops. This means that a message sent from a peer visits on the average 5.6 intermediate peers on its way to its destination peer.

Unless not known and/or configured in advance, the size N of the network can be estimated by using an overlay network size estimation mechanism. One such mechanism, where the estimate is formed by using the average inter-peer distances on the predecessor and successor lists, is described in the IETF draft 'draft-ietf-p2psip-self-tuning-04' published July 2011.

When the value $T_R$ of the retransmission timer is determined in step 202, the value $T_T$ of the transaction timer is determined in step 203. The value $T_T$ is set to value that is greater than $T_R$. The value $T_T$ can preferably be determined from the equation:

$$T_T = \log_2(N) \times RTT_{MAX}$$

where $RTT_{MAX}$ is the largest of the $RTT_{ESTi}$ values determined from the RTT delay measurements mentioned above.

The factor '$\log_2(N)$' is the maximum hop count $HC_{MAX}$ for a message in the Chord based overlay network. This follows from the fact that the maximum path length is reached when a peer needs to route a message to a peer whose distance from the transmitting peer in the identifier space of the overlay network is $2^m$, where m is the number of bits in Node-IDs. A message traversing that distance needs to visit $\log_2(N)$ intermediate peers on its way to the destination Node-ID.

An alternative embodiment for determining the value of $T_T$ is to keep track of some number of most recent end-to-end transaction delays observed from peer 110 and use directly the maximum of those delays as the value of $T_T$. The benefit of this mechanism is that it is simpler to implement than the mechanism described above. The downside is that the mechanism is less accurate and may not be very responsive to changes in the size of the overlay network. It is also less reliable since it is directly impacted by the extreme values of observed end-to-end transaction delays.

When transmitting a message end-to-end from peer 110 towards a peer 130 for the first time in step 204, the transaction timer is started with value $T_T$ in step 205 and the retransmission timer is started with value $T_R$ in step 206.

The subsequent steps are illustrated in FIG. 3. If a response from peer 130 is received as expected within the time $T_R$ in step 301, the transaction timer and the retransmission timer are both stopped in step 302.

If a response is not received within time $T_R$, the retransmission timer fires in step 303. In this situation the message is retransmitted in step 304 and the retransmission timer is restarted in step 305. This sequence can be repeated as long as the transaction timer is still running.

If a response is still not received within time $T_T$ from when the first message was transmitted, the transaction timer fires in step 306. In this situation the message or its response is regarded as lost and the retransmission timer is stopped in step 307 and the transaction is terminated in step 308.

The embodiments described above for determining timer values can also be used to choose appropriate values for a various of other supervision timers used by peers in the overlay network. Supervision timers are also used to determine when a complex DHT operation such as a join or leave operation consisting of multiple transactions has failed. As an example, a join operation might consist of Fetch, Attach, Join, and Store transactions. It is possible to apply the method to each of these transactions separately to produce a maximum transaction delay estimate and then use the sum of these delays as the value for the join operation supervision timer.

The Session Initiation Protocol (SIP) described in the specification RFC3261 is used in P2PSIP. To enable P2P operation, P2PSIP uses RELOAD as a distributed rendez-vous mechanism for SIP. Since the two protocols, SIP and RELOAD, are used by the same application, both a RELOAD and a SIP protocol implementation can access and use the RTT and timer value estimates described above.

For example, to supervise an end-to-end transaction the values of the retransmission timer and the transaction timer ($T_R$ and $T_T$ respectively) can be used by the RELOAD protocol. The determined value of $RTT_{AVG}$ can be used to set the value T1 defined by the SIP specification. SIP uses T1 as the base value for its timers.

An alternative way of estimating the average hop count $HC_{avg}$ and the maximum hop count $HC_{MAX}$ is that a peer continuously measures the hop counts of messages that it originates in the overlay network. This can be done if the number of hops that a request traversed on its way to the destination Node-ID is returned back in the response that the request triggers. If this alternative mechanism is used, $HC_{avg}$ is calculated as the running average of hop counts that a peer observes. The value $HC_{MAX}$ is set to the maximum of the hop count values used to calculate the running averages.

The main benefit of this embodiment is that it is simpler since it does not require the peers to estimate the size of the overlay network. The downside of this mechanism is that it requires each peer to maintain additional state information (i.e., the observed hop count values). It may also be slower to adapt to changes in the size of the overlay, which results in greater inaccuracy.

Yet another embodiment is to calculate estimates for $HC_{avg}$ and $HC_{MAX}$ according to both embodiments above, and determine the $HC_{avg}$ and $HC_{MAX}$ to use as the average of those estimates.

Figure 4:
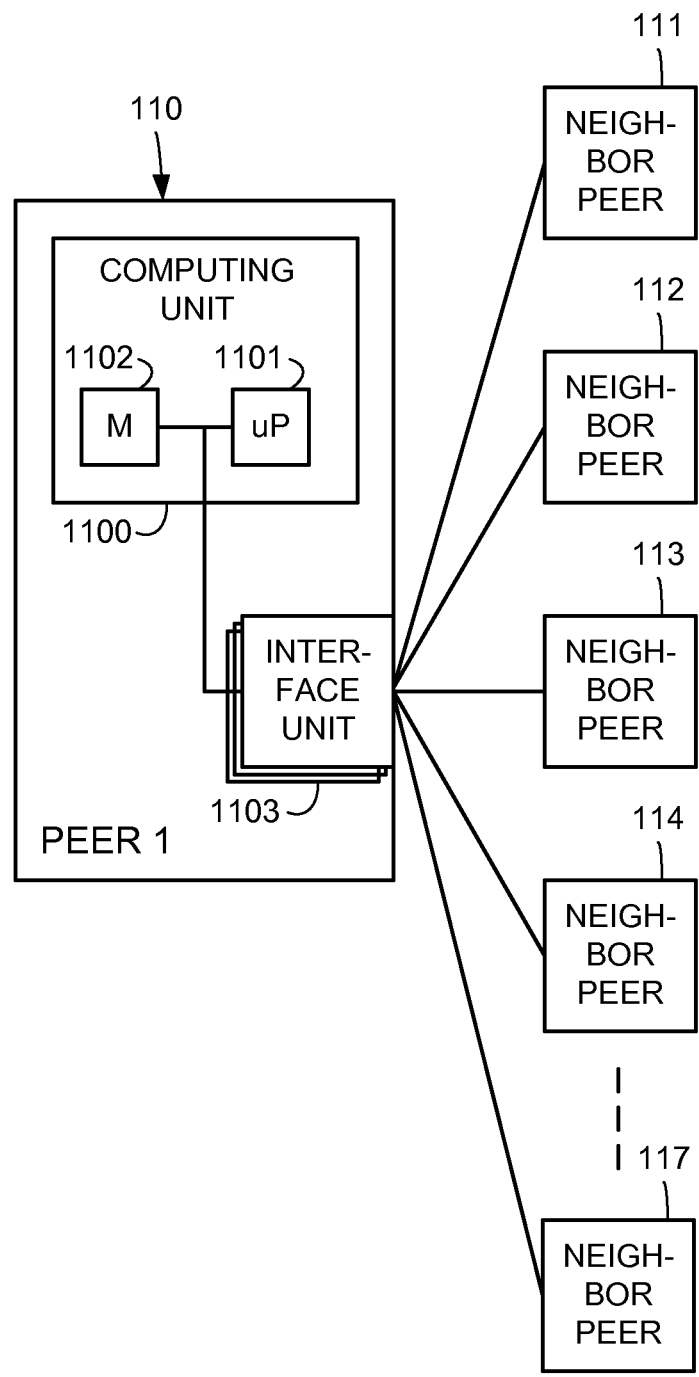
FIG. 4 is a block diagram illustrating an embodiment of a peer configured to execute the method to supervise the transactions.

An embodiment of a peer 110 is illustrated in FIG. 4. The peer 110 comprises at least one interface unit 1103 configured to be connected to at least one neighbor peer 111-117 in the overlay network.

The peer 110 also comprises a computing unit 1100 including a storing device M 1102 for storing among others the determined RTT and timer values and a processor device uP 1101 connected to the interface unit 1103 and to the storing device M 1102. The devices 1101,1102 in the computing unit 1100 could in an alternative embodiment be implemented using one or several FPGAs (Field-Programmable Gate Arrays).

The computing unit 1100 is configured to execute the method and at least one of its embodiments described above and illustrated by the flow charts in FIGS. 2 and 3.

That is, to supervise a transaction between the peer 110 and a second peer 130 including the steps to determine an average message round-trip time, $RTT_{AVG}$ between the peer 110 and its neighbor peers 111-117 and to determine a value $T_R$ for a retransmission timer from the equation $$T_R = \frac{1}{2} \times \log_2(N) \times RTT_{AVG}.$$

The computing unit 1100 is also configured to store the value $T_R$ and to determine and to store a value $T_T$ for a transaction timer that is greater than the value $T_R$. When transmitting a message over the interface unit 1103 towards a second peer 130 where the message requires a response, the computing unit 1100 is configured to start the transaction timer with the value $T_T$ and the retransmission timer with the value $T_R$.

If a response from the second peer 130 is not received within the time=$T_R$ from transmitting the message, the computing unit 1100 is configured to repeat the steps of transmitting the message and starting the retransmission timer if the transaction timer is still running.

If the response from the second peer 130 is not received within the time=$T_T$ from transmitting the first message, the computing unit 1100 is configured to terminate the transaction.

The invention claimed is:

1. A method of operating a first peer configured to supervise a transaction between the first peer and a second peer in a structured distributed hash table based peer-to-peer overlay network comprising a plurality N of peers, the first peer being a computing device connected to the peer-to-peer overlay network, said method comprising:
   determining an average message round-trip time ($RTT_{AVG}$) between the first peer and its neighbor peers in the overlay network;
   determining a value $T_R$ for a retransmission timer from an equation $$T_R = \frac{1}{2} \times \log_2(N) \times RTT_{AVG};$$

determining a value $T_T$ for a transaction timer that is greater than the value $T_R$;
   transmitting a message by the first peer towards the second peer via the peer-to-peer overlay network where the message requires a response;
   starting the transaction timer with the value $T_T$;
   starting the retransmission timer with the value $T_R$;
   in response to determining a response from the second peer is not received within the time=$T_R$ from transmitting the message, repeating the transmitting of the message by the first peer via the peer-to-peer overlay network and starting the retransmission timer if the transaction timer is still running;

in response to determining the response from the second peer is not received within the time=$T_T$ from transmitting a first message, terminating the transaction.

2. The method as in claim 1, wherein the average message round-trip time ($RTT_{AVG}$) is determined from an equation $$RRT_{AVG} = \frac{\sum_{i=1}^{K} RTT_{EST_i}}{K}$$

where K is a number of neighbor peers and $RTT_{EST_i}$ is an estimated message round-trip time between the first peer and an ith neighbor peer.

3. The method as in claim 2, further comprising estimating the value of the message round-trip time ($RTT_{EST_i}$) by regularly measuring a round-trip time for transmitted messages to the ith neighbor peer and received responses, and calculating an average of the measured values.

4. The method as in claim 3, wherein estimating the round-trip time ($RTT_{EST_i}$) comprises storing round-trip time related to M most recent received responses from the ith neighbor peer and calculating an average round-trip time value for the M most recent received responses.

5. The method as in claim 4, wherein calculating the average round-trip time for the M most recent received responses comprises selecting a median value of the M round-trip time values.

6. The method as in claim 3, wherein estimating the round-trip time ($RTT_{EST_i}$) comprises calculating the round-trip time ($RTT_{EST_i}$) from an equation:

$RTT_{EST_i} = \alpha \times RTT_{EST_i} + (1-\alpha) \times RTT_{SAMPLE}$ where $RTT_{SAMPLE}$ is a round-trip time related to a response from the ith neighbor peer in the most recent transaction and α is a weight value in a range of 0<α<1.

7. The method as in claim 2, further comprising:
determining an estimated maximum message round-trip time ($RTT_{MAX}$) between the first peer and its neighbor peers in the overlay network;
determining the transaction timer value $T_T$ from an equation:

$T_T = \log_2(N) \times RTT_{MAX}$

8. The method as in claim 7, wherein determining the estimated maximum message round-trip time ($RTT_{MAX}$) includes selecting a largest of the $RTT_{EST_i}$ values.

9. The method as in claim 1, wherein determining the average message round-trip time ($RTT_{AVG}$) further includes collecting a corresponding $RTT_{AVG_i}$ value from at least one other peer in the overlay network and calculating a new average value $RTT_{AVG}$ from an equation:

$$RRT_{AVG} = \frac{RRT_{AVG} + \sum_{i=1}^{J} RRT_{AVG_i}}{J+1}$$

where J is a number of collected $RTT_{AVG_i}$ values.

10. The method as in claim 9, wherein the $RTT_{AVG_i}$ values are collected from at least one neighbor peer.

11. The method as in claim 1, wherein transmitting the message is performed using a RELOAD protocol.

12. A first peer in a structured distributed hash table based peer-to-peer overlay communication network comprising a plurality N of peers, the first peer comprising:
at least one interface unit operative to be communicatively coupled to at least one neighbor peer via the peer-to-peer overlay communication network;
a computing unit including a storing device and a processing device, the processing device to execute an algorithm to supervise a transaction between the first peer and a second peer including the operations to:
determine an average message round-trip time ($RTT_{AVG}$) between the first peer and its neighbor peers;
determine a value $T_R$ for a retransmission timer from an equation $T_R = \frac{1}{2} \times \log_2(N) \times RTT_{AVG}$;

store the value $T_R$ and to determine and to store a value $T_T$ for a transaction timer that is greater than the value $T_R$;
transmit a message over the interface unit via the peer-to-peer overlay communication network towards the second peer where the message requires a response; and
start the transaction timer with the value $T_T$ and the retransmission timer with the value $T_R$ and in response to determining a response from the second peer is not received within the time=$T_R$ from transmitting the message, retransmit the message to the second peer via the peer-to-peer overlay communication network, and in response to determining the response from the second peer is not received within the time=$T_T$ from transmitting a first message, terminate the transaction.

* * * * *